(12) United States Patent
Nemirovsky et al.

(10) Patent No.: US 11,507,385 B1
(45) Date of Patent: Nov. 22, 2022

(54) EMBEDDED ELECTRONIC DEVICE, BOOT METHOD, AND EMBEDDED ELECTRONIC DEVICE READABLE RECORDING MEDIUM WITH STORED PROGRAM

(71) Applicant: Cortina Access, Inc., San Jose, CA (US)

(72) Inventors: Aleksandr Nemirovsky, San Jose, CA (US); Jian-Jr Li, San Jose, CA (US); He Zhu, San Jose, CA (US)

(73) Assignee: CORTINA ACCESS, INC., San Jose, CA (US)

( * ) Notice: Subject to any disclaimer, the term of this patent is extended or adjusted under 35 U.S.C. 154(b) by 0 days.

(21) Appl. No.: 17/302,323

(22) Filed: Apr. 30, 2021

(51) Int. Cl.
*G06F 9/44* (2018.01)
*G06F 9/4401* (2018.01)

(52) U.S. Cl.
CPC .................. *G06F 9/4401* (2013.01)

(58) Field of Classification Search
CPC ................................ G06F 9/4401
See application file for complete search history.

(56) References Cited

U.S. PATENT DOCUMENTS

| | | | |
|---|---|---|---|
| 8,589,302 B2 | 11/2013 | Prakash et al. | |
| 10,067,834 B1* | 9/2018 | Montero | G06F 11/1417 |
| 2003/0154368 A1* | 8/2003 | Stevens, Jr. | G06F 9/4401 |
| | | | 713/1 |
| 2011/0138219 A1* | 6/2011 | Walton | G06F 11/0712 |
| | | | 714/48 |

FOREIGN PATENT DOCUMENTS

CN 105027080 A 11/2015

OTHER PUBLICATIONS

GNU GRUB, Erich Boleyn, https://en.wikipedia.org/wiki/GNU_GRUB, Jun. 8, 2021.
Das U-Boot, DENX Software Engineering, https://en.wikipedia.org/wiki/Das_U-Boot, Oct. 15, 1999.

* cited by examiner

*Primary Examiner* — Stefan Stoynov
(74) *Attorney, Agent, or Firm* — McClure, Qualey & Rodack, LLP

(57) ABSTRACT

An embedded electronic device, a boot method, and an electronic device readable recording medium with a stored program are provided. A processor in the embedded electronic device executes a plurality of stage boot procedures after the embedded electronic device is powered on. Each of the stage boot procedures includes: executing current-stage boot firmware; reading a test request message and a firmware location message from a first memory; loading next-stage boot firmware according to the firmware location message in response to the test request message being a current-stage request; and updating the test request message to a next-stage request and updating the firmware location message to a next boot firmware location when the loading of the next-stage boot firmware succeeds, or otherwise, updating the test request message to a failure message and soft rebooting the embedded electronic device.

15 Claims, 4 Drawing Sheets

EMBEDDED ELECTRONIC DEVICE, BOOT METHOD, AND EMBEDDED ELECTRONIC DEVICE READABLE RECORDING MEDIUM WITH STORED PROGRAM

BACKGROUND

Technical Field

The present invention relates to embedded electronic device technologies, and in particular, to an embedded electronic device, a boot method, and an electronic computing device readable recording medium with a stored program.

Related Art

A boot-loader, also referred to as firmware of an embedded electronic device, is a program of the embedded electronic device prior to running of a core of an operating system. The boot-loader executes a boot procedure of the embedded electronic device. The embedded electronic device may initialize a hardware device and establish mapping of memory space through the boot-loader, so as to set a software and hardware environment of the embedded electronic device to a proper state, thereby preparing a correct software and hardware environment for the core of the operating system. Since the embedded electronic device is usually customized to meet diverse requirements, the boot-loader also needs to be frequently updated. The boot-loader of the embedded electronic device is usually stored in a flash memory. A traditional method for upgrading the boot-loader is to erase an old boot-loader stored in a corresponding block of the flash memory and then write a new boot-loader into the block. If an error occurs during the writing or the new boot-loader has an error, causing the updated firmware to fail to run, the embedded electronic device cannot complete the boot. Traditionally, a single system boot-loader is configured to boot a computer system from a list of images that provide further functions. For example, GNU GRUB and Das UBOOT are traditional system boot-loaders, which implement selection of an image from an external memory. However, the technologies support neither a plurality of boot-loaders nor recovery when the boot-loader self fails

SUMMARY

In view of the above, the present invention provides an embedded electronic device, a boot method, an embedded electronic device readable recording medium with a stored program, and an embedded electronic device program product to alleviate the existing technical problems.

According to some embodiments, an embedded electronic device includes a processor and a first memory. The first memory is a non-volatile memory and stores a test request message and a firmware location message. The processor executes a plurality of stage boot procedures after the embedded electronic device is powered on. Each of the stage boot procedures includes steps of: executing current-stage boot firmware; loading next-stage boot firmware according to the firmware location message in response to the test request message being a current-stage request; and updating the test request message to a next-stage request and updating the firmware location message to a next boot firmware location when the loading of the next-stage boot firmware succeeds, or otherwise, updating the test request message to a failure message and soft rebooting the embedded electronic device.

According to some embodiments, a boot method, applicable to an embedded electronic device, includes steps of: executing, by a processor, a plurality of stage boot procedures after the embedded electronic device is powered on. Each of the stage boot procedures includes: executing current-stage boot firmware; reading a test request message and a firmware location message from a first memory, where the first memory is a non-volatile memory; loading next-stage boot firmware according to the firmware location message in response to the test request message being a current-stage request; and updating the test request message to a next-stage request and updating the firmware location message to a next boot firmware location when the loading of the next-stage boot firmware succeeds, or otherwise, updating the test request message to a failure message and soft rebooting the embedded electronic device.

According to some embodiments, an embedded electronic device readable recording medium with a stored program which, when loaded and executed by an embedded electronic device, causes the above boot method to be performed.

According to some embodiments, in the embedded electronic device, the boot method and the embedded electronic device readable recording medium with a stored program, the processor loads the next-stage boot firmware according to the firmware location message in response to the test request message being the current-stage request in each of the stage boot procedures. The test request message is updated to a next-stage request and the firmware location message is updated to a next boot firmware location when the loading of the next-stage boot firmware succeeds, or otherwise, the test request message is updated to a failure message and the embedded electronic device is soft rebooted. After the soft reboot, the test request message has been changed to the failure message. At this time, the embedded electronic device uses an original boot-loader. Accordingly, the embedded electronic device may detect and recover an instant error of the tested boot firmware, thereby allowing a faster development cycle. According to some embodiments, since the embedded electronic device, the boot method, the embedded electronic device readable recording medium with a stored program, and the embedded electronic device program product have a plurality of boot processes, a user may plan proper functions for each-stage boot firmware, so that the boot firmware can have complex functions and be more portable. According to some embodiments, the embedded electronic device, the boot method, the embedded electronic device readable recording medium with a stored program, and the embedded electronic device program product use only the test request message and the firmware location message in the first memory. Therefore, the embedded electronic device, the boot method and the embedded electronic device readable recording medium with a stored program do not require too many additional system resources and are applicable to any embedded electronic devices with limited resources.

DETAILED DESCRIPTION

The above and other technical contents, features and effects of the present invention are clearly presented in the following detailed description of the embodiments with reference to the drawings. The term "connect" mentioned in the following embodiments may refer to any direct or indirect connection means.

Figure 1:
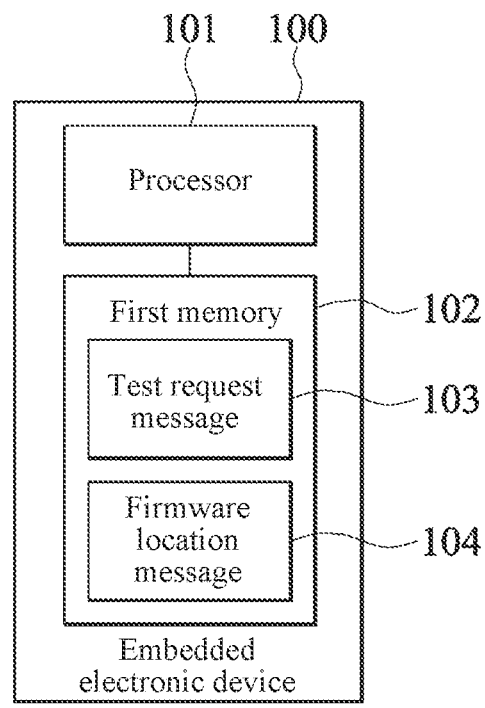
FIG. 1 is a schematic system block diagram of an embedded electronic device according to an embodiment of the present invention.

FIG. 1 is a schematic system block diagram of an embedded electronic device according to an embodiment of the present invention. Referring to FIG. 1, an embedded electronic device 100 includes a processor 101 and a first memory 102. The first memory 102 stores a test request message 103 and a firmware location message 104. The first memory 102 is a non-volatile memory, which can remain its content after the embedded electronic device 100 is soft rebooted. A boot method and cooperation between hardware of the embedded electronic device 100 according to an embodiment of the present invention are described in detail below with reference to the drawings.

Figure 6:
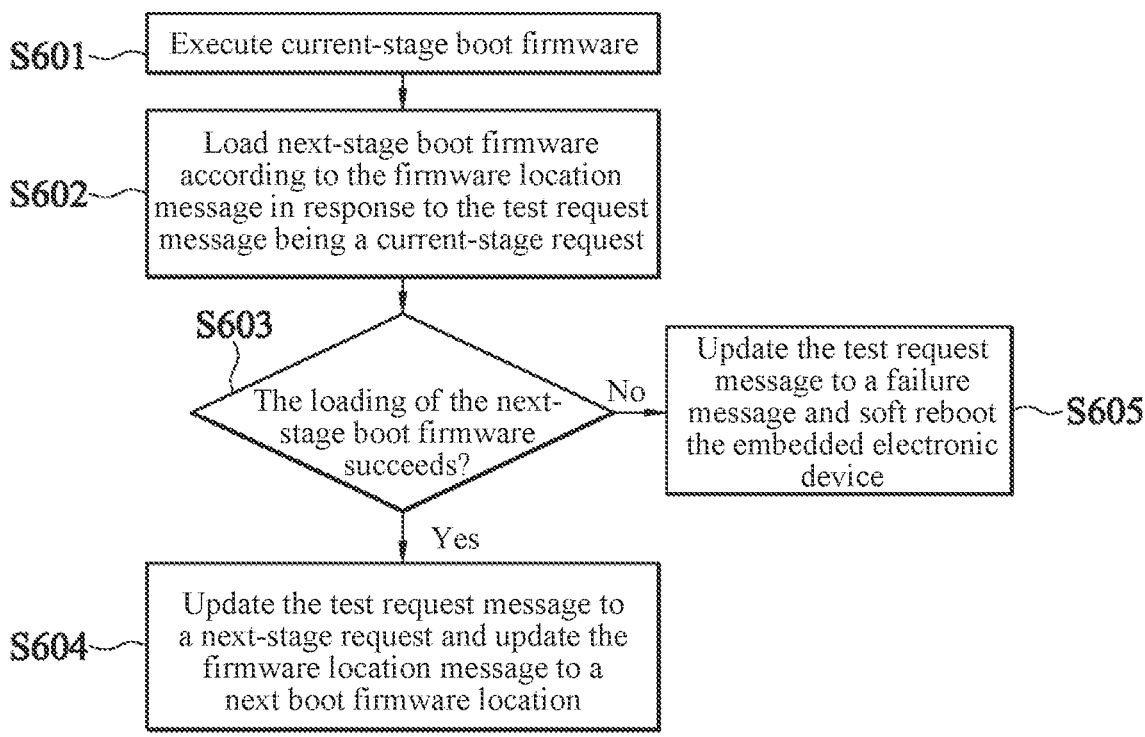
FIG. 6 is a flowchart of steps according to an embodiment of the present invention.

FIG. 6 is a flowchart of steps according to an embodiment of the present invention. Referring to both FIG. 1 and FIG. 6, the processor 101 executes a plurality of stage boot procedures after the embedded electronic device 100 is powered on. Each of the stage boot procedures includes steps S601 to S605.

In step S601, the processor 101 executes current-stage boot firmware. In step S602, the processor 101 loads next-stage boot firmware according to the firmware location message 104 in response to the test request message 103 being a current-stage request.

In step S603, the processor 101 determines whether the loading of the next-stage boot firmware succeeds. Whether the loading of the next-stage boot firmware succeeds may be determined by using many methods. In some embodiments, the processor 101 may first read a length of the next-stage boot firmware and a preset check value. The processor 101 then reads all contents of the next-stage boot firmware and calculates a check value of the next-stage boot firmware. The processor 101 then compares the check value calculated above with the preset check value to determine whether the check value calculated above is correct. If the check value calculated above is correct, it can be determined that the loading of the next-stage boot firmware succeeds. If the check value is incorrect, it can be determined that the loading of the next-stage boot firmware is unsuccessful. However, certainly, whether the loading of the next-stage boot firmware succeeds may also be determined by using other technical methods. The present invention is not limited thereto.

When the loading of the next-stage boot firmware succeeds, step S604 is performed by the processor 101. In step S604, the test request message 103 is updated to a next-stage request and the firmware location message 104 is updated to a next boot firmware location.

When the loading of the next-stage boot firmware is unsuccessful, step S605 is performed. In step S605, the test request message 103 is updated to a failure message and the embedded electronic device 100 is soft rebooted.

After the soft reboot, the test request message has been changed to the failure message. At this time, the processor 101 of the embedded electronic device 100 loads preset next-stage boot firmware according to a preset firmware location message in response to the test request message 103 being the failure message. The preset next-stage boot firmware is an original boot-loader.

Figure 2:
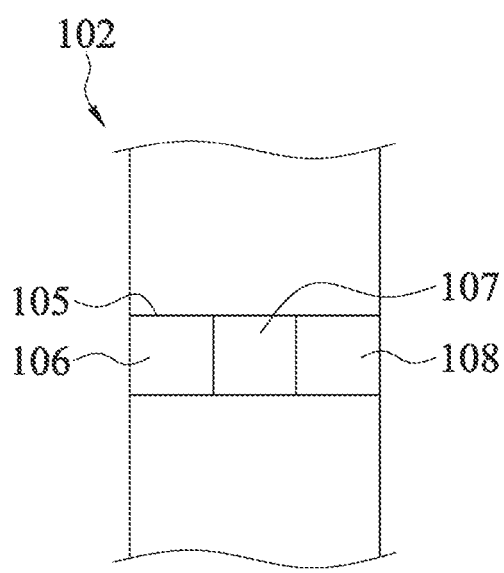
FIG. 2 is a schematic diagram of memory planning for a test request message and a firmware location message according to an embodiment of the present invention.

FIG. 2 is a schematic diagram of memory planning for the test request message 103 and the firmware location message 104 according to an embodiment of the present invention. Referring to FIG. 2, in an embodiment of the present invention, a memory 105 is pre-planned in the first memory 102 to store the test request message 103 and the firmware location message 104. In some embodiments, the memory 105 has a 32-bit capacity. The test request message 103 is stored in least significant 2 bits 108 of the memory 105. In the least significant 2 bits 108, a bit status 00 indicates the failure message, a bit status 01 indicates the first-stage request, a bit status 10 indicates a second-stage request, and a bit status 11 indicates a final-stage request. The firmware location message 104 is stored in intermediate 4 bits 107 of the memory 105. Most significant 26 bits 106 of the memory 105 may record other parameter messages.

In the embodiment of FIG. 2, the processor 101 reads all bit data of the memory 105 at one time, and then obtains the test request message 103 and the firmware location message 104 through bitwise operation. In this way, the test request message 103 and the firmware location message 104 can be quickly obtained. Certainly, the test request message 103 and the firmware location message 104 may also be stored in the first memory 102 in a different manner. The present invention is not limited thereto.

Figure 3:
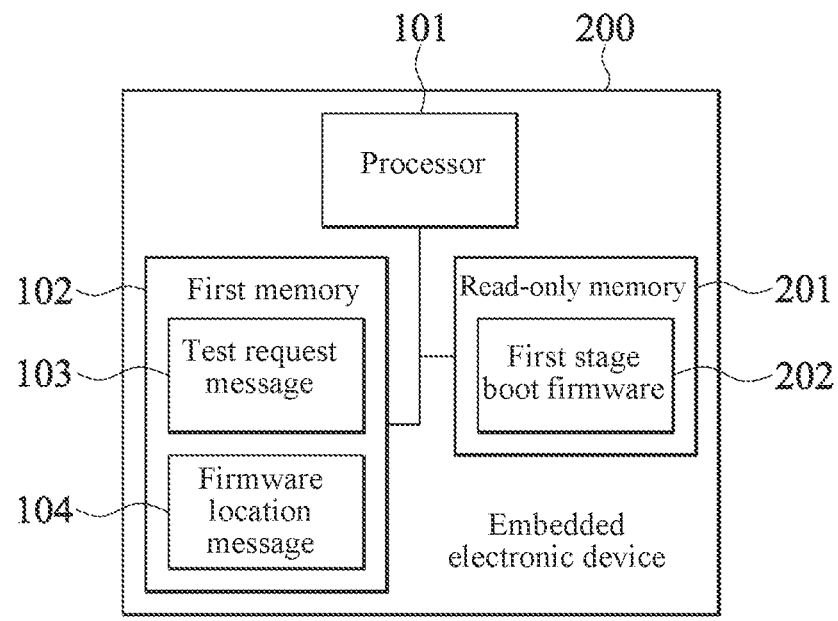
FIG. 3 is a schematic system block diagram of an embedded electronic device according to an embodiment of the present invention.

FIG. 3 is a schematic system block diagram of an embedded electronic device according to another embodiment of the present invention. Referring to FIG. 3, an embedded electronic device 200 includes a read-only memory 201. The read-only memory 201 stores first-stage boot firmware 202.

Figure 7:
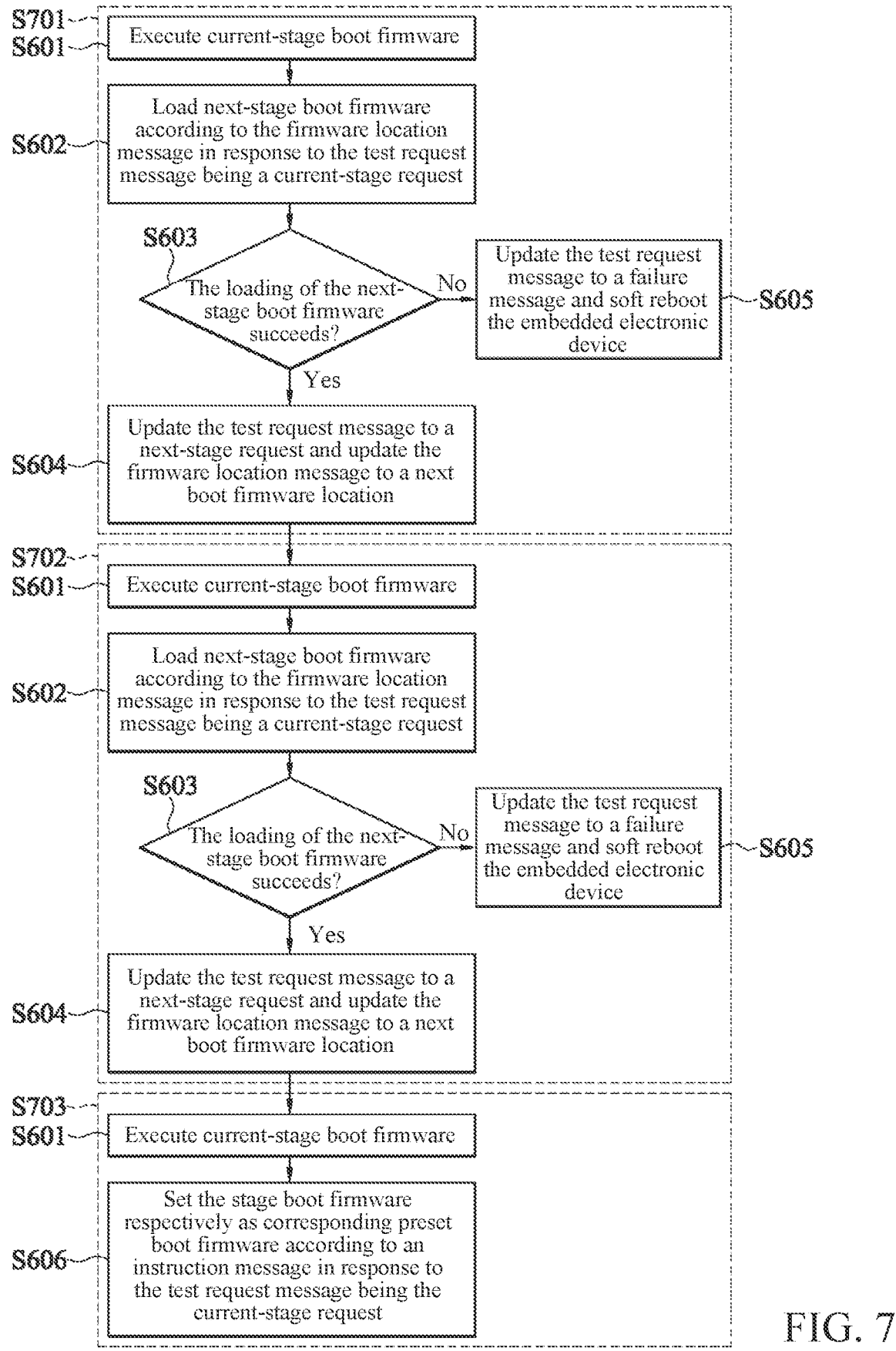
FIG. 7 is a flowchart of steps according to an embodiment of the present invention.

FIG. 7 is a flowchart of steps according to an embodiment of the present invention. Referring to both FIG. 3 and FIG. 7, the processor 101 executes M stage boot procedures after the embedded electronic device 100 is powered on, where M is any positive integer greater than 1. In this embodiment, M=3. Therefore, the step flowchart shown in FIG. 7 includes a first-stage boot procedure S701, a second-stage boot procedure S702, and a final-stage boot procedure S703.

Both the first-stage boot procedure S701 and the second-stage boot procedure S702 include the above steps S601 to S605. The final-stage boot procedure S703 includes steps S601 and S606.

The processor 101 executes the first-stage boot procedure S701 after the embedded electronic device 100 is powered on. When executing the first-stage boot procedure S701, the processor 101 reads the first-stage boot firmware 202 stored in the read-only memory 201 as the current-stage firmware.

The processor 101 executes the first-stage boot firmware 202 as the current-stage firmware. The processor 101 loads second-stage boot firmware according to the firmware location message 104 in response to the test request message 103 being the first-stage request. When the processor 101 successfully loads the second-stage boot firmware, the test request message 103 is updated to the second-stage request, and the firmware location message 104 is updated to a second boot firmware location by the processor 101.

Next, the processor 101 executes the second-stage boot procedure S702.

After the processor 101 performs the first-stage boot procedure S701 and the second-stage boot procedure S702, the processor 101 has successfully loaded and executed the first-stage boot firmware and the second-stage boot firmware and successfully loaded the final-stage boot firmware. At this time, the processor 101 further executes the final-stage boot procedure S703. Executing the final-stage boot procedure S703 includes: executing, by the processor 101, previous-stage boot firmware successfully loaded by a previous-stage boot procedure in response to the test request message 103 being the current-stage request.

If the processor 101 successfully executes the previous-stage boot firmware loaded by the previous-stage boot procedure, all stage boot firmware has been successfully tested. In this case, the processor 101 may set the stage boot firmware respectively as corresponding preset boot firmware according to an instruction message. The stage boot firmware becomes preset selected firmware during subsequent boot of the embedded electronic device 200. Certainly, according to the instruction message, the stage boot firmware may not be selected as the preset boot firmware. In this case, the stage boot firmware is merely used for testing, but does not cause changes to be permanent.

In an embodiment of the present invention, the first-stage boot firmware 202 is stored in a flash memory in a manner of restricting read and write of the first-stage boot firmware. The read and write restriction may be implemented by software or hardware.

Figure 4:
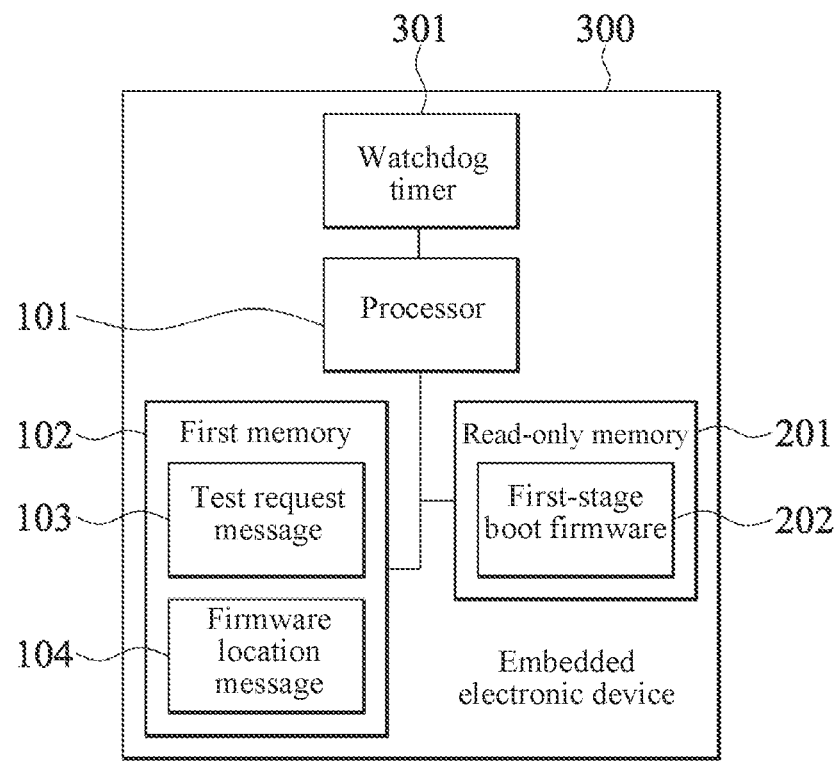
FIG. 4 is a schematic system block diagram of an embedded electronic device according to an embodiment of the present invention.

FIG. 4 is a schematic system block diagram of an embedded electronic device according to an embodiment of the present invention. Referring to FIG. 4, an embedded electronic device 300 further includes a watchdog timer 301. In some embodiments, the processor 101 first starts the watchdog timer 301 when executing each of the stage boot procedures. The watchdog timer transmits a reboot signal to the embedded electronic device 300 when counting to a predetermined time. The processor 101 updates the test request message to the failure message and soft reboots the embedded electronic device 300 in response to the reboot signal.

Figure 5:
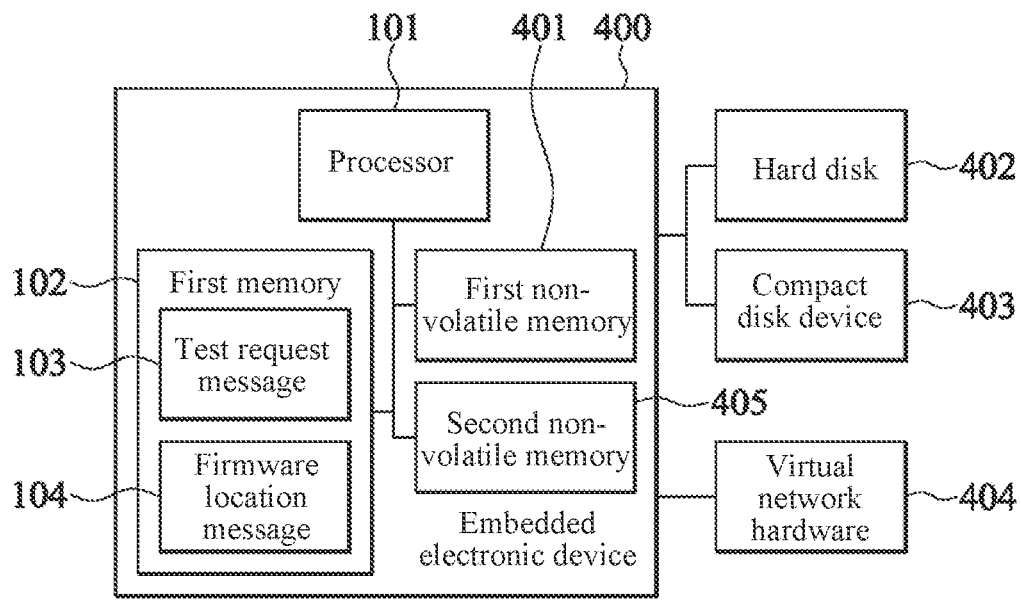
FIG. 5 is a schematic system block diagram of an embedded electronic device and an external connected apparatus according to an embodiment of the present invention.

FIG. 5 is a schematic system block diagram of an embedded electronic device and an external connected apparatus according to an embodiment of the present invention. Referring to FIG. 5, compared with FIG. 1, an embedded electronic device 400 further includes a first non-volatile memory 401 and a second non-volatile memory 405. The embedded electronic device 400 is externally connected to a hard disk 402 and a compact disk device 403. In some embodiments, the embedded electronic device 400 is connected to virtual network hardware 404 through a network.

As described above, the boot firmware of the embedded electronic device is usually stored in a flash memory. In some embodiments, the different stage boot firmware may be stored in different flash memories or in different partitions in the same flash memory. In some embodiments, the firmware location message includes a device number and a partition number to indicate the location in which the different stage boot firmware is stored.

In some embodiments of the present invention, the different stage boot firmware is stored in different partitions of different devices, for example, different partitions of elements shown in FIG. 5 such as the first non-volatile memory 401, the second non-volatile memory 402, the hard disk 402, the compact disk device 403, or the virtual network hardware 404. In some embodiments, the firmware location message includes a device number and a partition number to indicate partitions of devices in which the different stage boot firmware is stored.

In this specification, the term "embedded electronic device readable medium" refers to a non-volatile, non-transitory medium, such as a read only memory (ROM), a flash memory, a floppy disk, a hard disk, a compact disk (CD), a digital versatile disc (DVD), a flash drive, a database accessible by a network, or any other storage medium with the same functions known to those with ordinary knowledge in the technical field of the present invention. These and other various forms of embedded electronic device readable media may involve carrying one or more sequences of one or more instructions to the processor 101 for execution. These instructions embodied in the media are usually referred to as "embedded electronic device program code" or "embedded electronic device program product". The "embedded electronic device program code" or the "embedded electronic device program product" may be a file that can be transmitted over the network, or may be stored in a non-transitory electronic computing device readable storage medium. These instructions may cause, when executed, the processor 101 to perform the steps or the functions described in the present invention.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An embedded electronic device, comprising:
 a processor; and
 a first non-volatile memory configured to store a test request message and a firmware location message; wherein
 the processor is configured to execute a plurality of stage boot procedures after the embedded electronic device is powered on, wherein each of the stage boot procedures comprises:
 executing a current-stage boot firmware procedure;
 loading next-stage boot firmware according to the firmware location message in response to the test request message being a current-stage request;
 in response to a successful loading of a next-stage boot firmware procedure, updating the test request message to a next-stage request and updating the firmware location message to a next boot firmware location, and
 in response to an unsuccessful loading of a next-stage boot firmware procedure, updating the test request message to a failure message, not updating the firmware location message location, and performing a soft rebooting the embedded electronic device.

2. The embedded electronic device according to claim 1, further comprising a read-only memory configured to store first-stage boot firmware, wherein the processor is configured to use the first-stage boot firmware as the current-stage boot firmware when executing a first-stage boot procedure of the stage boot procedures.

3. The embedded electronic device according to claim 1, wherein the processor is further configured to execute a final-stage boot procedure after executing the stage boot procedures, wherein the final-stage boot procedure comprises:
after executing the current-stage boot firmware successfully loaded by a previous-stage boot procedure, setting the current-stage boot firmware in each of the stage boot procedures respectively as corresponding preset boot firmware according to an instruction message in response to the test request message being the current-stage request.

4. The embedded electronic device according to claim 1, further comprising a watchdog timer, wherein the processor is configured to first start the watchdog timer when executing each of the stage boot procedures, the watchdog timer is configured to transmit a reboot signal to the embedded electronic device upon reaching a predetermined time, and the processor is configured to update the test request message to the failure message and soft reboot the embedded electronic device in response to the reboot signal.

5. The embedded electronic device according to claim 1, wherein each of the stage boot procedures further comprises:
loading preset next-stage boot firmware according to a preset firmware location message in response to the test request message being the failure message.

6. The embedded electronic device according to claim 1, wherein the firmware location message comprises a device number and a partition number.

7. The embedded electronic device according to claim 6, wherein a device indicated by the device number is a non-volatile memory device, a hard disk, a compact disk device, or virtual network hardware.

8. A boot method, applicable to an embedded electronic device, the method comprising:
executing, by a processor of the embedded electronic device, a plurality of stage boot procedures after the embedded electronic device is powered on, wherein each of the stage boot procedures comprises:
executing current-stage boot firmware procedure;
reading a test request message and a firmware location message from a first non-volatile memory;
loading next-stage boot firmware according to the firmware location message, in response to the test request message being a current-stage request;
updating the test request message to a next-stage request and updating the firmware location message to a next boot firmware location, in response to a successful loading of the next-stage boot firmware procedure, and
updating the test request message to a failure message and soft rebooting the embedded electronic device, in response to an unsuccessful loading of the next-stage boot firmware procedure.

9. The boot method according to claim 8, wherein the processor is configured to read first-stage boot firmware from a read-only memory and use the first-stage boot firmware as the current-stage firmware when executing a first-stage boot procedure of the stage boot procedures.

10. The boot method according to claim 8, wherein the processor is further configured to execute a final-stage boot procedure after executing the stage boot procedures, wherein the final-stage boot procedure comprises:
after executing the current-stage boot firmware successfully loaded by a previous-stage boot procedure, setting the current-stage boot firmware in each of the stage boot procedures respectively as corresponding preset boot firmware according to an instruction message in response to the test request message being the current-stage request.

11. The boot method according to claim 8, further comprising:
first starting, by the processor, a watchdog timer when executing each of the stage boot procedures; transmitting, by the watchdog timer, a reboot signal to the embedded electronic device upon reaching a predetermined time; and updating, by the processor, the test request message to the failure message and soft rebooting the embedded electronic device in response to the reboot signal.

12. The boot method according to claim 8, wherein each of the stage boot procedures further comprises:
loading preset next-stage boot firmware according to a preset firmware location message in response to the test request message being the failure message.

13. The boot method according to claim 8, wherein the firmware location message comprises a device number and a partition number.

14. The boot method according to claim 13, wherein a device indicated by the device number is a non-volatile memory device, a hard disk, a compact disk device, or virtual network hardware.

15. An embedded electronic device readable recording medium with a stored program which, when loaded and executed by an embedded electronic device, causes the method according to claim 8 to be performed.

* * * * *

UNITED STATES PATENT AND TRADEMARK OFFICE
CERTIFICATE OF CORRECTION

PATENT NO. : 11,507,385 B1  
APPLICATION NO. : 17/302323  
DATED : November 22, 2022  
INVENTOR(S) : Aleksandr Nemirovsky et al.

It is certified that error appears in the above-identified patent and that said Letters Patent is hereby corrected as shown below:

On the Title Page

Item (73): Assignee delete "CORTINA ACCESS, INC., San Jose, CA (US)" and insert therefor --REALTEK SINGAPORE PTE LTD., SINGAPORE, SG (SG)--

Signed and Sealed this  
Nineteenth Day of December, 2023

Katherine Kelly Vidal  
*Director of the United States Patent and Trademark Office*